United States Patent [19]
Wada

[11] Patent Number: 5,217,306
[45] Date of Patent: Jun. 8, 1993

[54] TEMPERATURE DISTRIBUTION ANALYZER USING OPTICAL FIBER

[75] Inventor: Fumio Wada, Sakura, Japan

[73] Assignee: Fujikura Ltd., Japan

[21] Appl. No.: 810,518

[22] Filed: Dec. 19, 1991

[30] Foreign Application Priority Data

Mar. 2, 1991 [JP]  Japan .................................. 3-61232

[51] Int. Cl.$^5$ .............................................. G01J 5/00
[52] U.S. Cl. .................................... 374/161; 374/131; 356/44; 356/301
[58] Field of Search ............... 374/130, 131, 137, 159, 374/161, 116, 44; 356/301; 250/227.14

[56] References Cited

U.S. PATENT DOCUMENTS

| | | | |
|---|---|---|---|
| 4,673,299 | 6/1987 | Dakin | 374/131 |
| 4,767,219 | 8/1988 | Bibby | 374/131 |
| 4,823,166 | 4/1989 | Hortog et al. | 374/131 |
| 4,958,910 | 9/1990 | Taylor et al. | 356/44 |
| 5,054,935 | 10/1991 | Tanabe et al. | 374/161 |
| 5,102,232 | 4/1992 | Tanabe et al. | 374/161 |

FOREIGN PATENT DOCUMENTS

| | | | |
|---|---|---|---|
| 0190001 | 6/1986 | European Pat. Off. | |
| 64-69925 | 3/1989 | Japan | 374/137 |
| 2122337 | 1/1984 | United Kingdom | 374/161 |
| 2211605 | 7/1989 | United Kingdom | 374/161 |

OTHER PUBLICATIONS

European Search Report dated Jun. 1, 1992.
J. P. Dakin and D. J. Pratt; Temperature Distribution Measurement Using Raman Ratio Thermometry, vol. 566, Aug. 20, 1985, San Diego, pp. 249–256.

Primary Examiner—William A. Cuchlinski, Jr.
Assistant Examiner—G. Bradley Bennett
Attorney, Agent, or Firm—Thompson, Hine and Flory

[57] ABSTRACT

A temperature distribution analyzer is disclosed. In the analyzer, a measuring optical fiber is provided so as to extend through a target region in order to analyze the temperature distribution of the region. A LD pumped solid state laser generates pulse light having high energy and supplies the pulse light to one of the terminal portions of an optical fiber. This causes a stimulated-Raman-scattering phenomenon in the optical fiber whereby Raman-scattered light is obtained from the other terminal portion of the excitation optical fiber. An optical filter selects light having a predetermined wavelength from the Raman-scattered light and outputs the selected light. An optical device introduces the output light of the optical filter to one of the terminal portions of the measuring optical fiber and receives Raman-backscattered light generated in the measuring optical fiber through the same terminal portion. A photodetector converts the Raman-backscattered light to an electrical signal. A computing device determines temperatures of portions of the measuring optical fiber based on the variation over time of the electrical signal.

4 Claims, 1 Drawing Sheet

TEMPERATURE DISTRIBUTION ANALYZER USING OPTICAL FIBER

BACKGROUND OF THE INVENTION

The present invention relates to temperature distribution analyzers for analyzing the temperature distribution of a target region by supplying a pulse light to an optical fiber and analyzing the response signal returned from the fiber.

Conventionally, devices are known which have an OTDR (Optical Time Domain Reflectometry) device and an optical fiber. The optical fiber is provided so as to extend through a target region, the temperature distribution of which is to be analyzed. The OTDR device provides a light source, a photodetector and an analyzer. An input pulse light is generated by the light source and is input to the input terminal portion of the optical fiber. The input pulse light then propagates through the optical fiber toward the other terminal portion thereof. There is a tendency, however, for a portion of the input pulse light which is propagating along the length of the fiber, and in an orientation substantially parallel to the longitudinal axis thereof, to disperse or scatter at each point along the optical path. This is the so-called "scattering phenomenon". In the optical fiber, two kinds of scattering are known: the Rayleigh-scattering phenomenon and the Raman-scattering phenomenon. These phenomena result in scattered light including Rayleigh-scattered light and Raman-scattered light. A portion of scattered light is reflected back to the input terminal of the optical fiber by the backward scattering of light. This backscattered light includes Raman-backscattered light. The Raman-backscattered light includes Anti-Stokes light, the wavelength of which is shorter than that of the input pulse light by a predetermined length, and Stokes light, the wavelength of which is longer than that of the input pulse light by a predetermined length. The intensities of the Anti-Stokes light and Stokes light are extremely sensitive to the temperature of the optical fiber. For this reason, the Raman-backscattered light is picked up from the input terminal of the optical fiber in order to analyze the temperature distribution of the target region. The Raman-backscattered light is supplied to the photodetector. The photodetector then converts the Raman-backscattered light to an electrical signal. The electrical signal is sampled by predetermined sampling intervals to obtain sample data. These sample data indicate the variation over time of the intensity of the Raman-scattered light since the input pulse light is input to the optical fiber. The analyzer then analyzes the sample data to determine temperatures at the points along the length of the fiber.

The intensity of the Raman-backscattered light as obtained above is $10^{-8}$ of the intensity of the input pulse light, so that it is necessary for the temperature distribution analysis to provide a high-intensity light source which supplies a high-intensity input pulse light to the optical fiber. Semiconductor lasers are not likely to be used as the light source because the intensities of their outputs are low; sufficiently high intensity Raman-backscattered light cannot be obtained. Recently, LD (Laser-Diode) pumped solid state lasers have come into practical use. The LD pumped solid state laser has a configuration similar to that of conventional solid state lasers in which a pumped light source and a solid crystal for laser oscillation are provided. The conventional solid state laser provides a flash lamp as the light source for pumping, whereas the LD pumped solid state laser provides a LD instead of the flash lamp. The LD pumped solid state laser can supply light at high efficiency and can be of reduced size. LD pumped solid state lasers exist which have a Nd-doped YAG ($Y_3Al_5O_{12}$) or YLF ($LiYF_4$) as the solid crystal, the oscillation frequency of which is 1.06 $\mu m$ or 1.32 $\mu m$. Generally, the LD pumped solid state laser having a solid crystal, the oscillation frequency of which is 1.32 $\mu m$, is used for applications employing a single mode optical fiber.

However, in the case where a pulse light having a wavelength of 1.32 $\mu m$ is supplied to an optical fiber by a LD pumped solid state laser, the Raman-scattered light having Anti-Stokes light, the wavelength of which is 1.25 $\mu m$, and having Stokes light, the wavelength of which is 1.40 $\mu m$, is generated in the optical fiber. Conventional optical fibers have cut-off frequencies in the range of 1.25 $\mu m$ to 1.28 $\mu m$. Accordingly, there are cases in which the wavelength of the Anti-Stokes light is shorter than the cut-off wavelength of the optical fiber and the wavelength does not satisfy a condition for the single mode transmission of the Anti-Stokes light. In these cases, the transmission loss for the Anti-Stokes light becomes large. Furthermore, the intensity of the Anti-Stokes light obtained can vary in response to a number of effects such as bending of the optical fiber. Accordingly, it is difficult to analyze the temperature distribution at high precision and to maintain the stability of the analysis.

A method may be considered in which the Stokes light having a wavelength longer than the cut-off wavelength of the optical fiber is used for the analysis. However, the sensitivity of the intensity of the Stokes light is about 1/7 of that of the Anti-Stokes light for the same variation of the temperature of the optical fiber. Accordingly, it is difficult to achieve the analysis at high precision.

SUMMARY OF THE INVENTION

In consideration of the above, it is an object of the present invention to provide a temperature distribution analyzer capable of achieving the analysis of the temperature distribution of a target region at high precision and at high reliability.

In an aspect of the present invention, there is provided a temperature distribution analyzer having a measuring optical fiber which is provided so as to extend through a target region, the temperature distribution of which is to be analyzed; a LD pumped solid state laser for generating a pulse light having high intensity; an optical fiber, one of the terminal portions of which receives the pulse light and in which a stimulated-Raman-Scattering phenomenon is established to generate Raman-scattered light; the optical fiber thereby outputs the stimulated-Raman-scattered light from the other terminal portion thereof; an optical filter for selecting light of a predetermined wavelength from the stimulated-Raman-scattered light and for outputting the selected light; an optical device for introducing the output light of the optical filter to one of the terminal portions of the measuring optical fiber and for receiving Raman-backscattered light generated in the measuring optical fiber through the terminal portion; a photodetector for converting the Raman-backscattered light to an electrical signal; and a computing device for determining temperatures of portions of the measuring optical fiber based on the variation over time of the electrical signal.

Further objects and advantages of the present invention will be understood from the following description of the preferred embodiments with reference to the drawing.

DETAILED DESCRIPTION OF THE PREFERRED EMBODIMENTS

Figure 1:
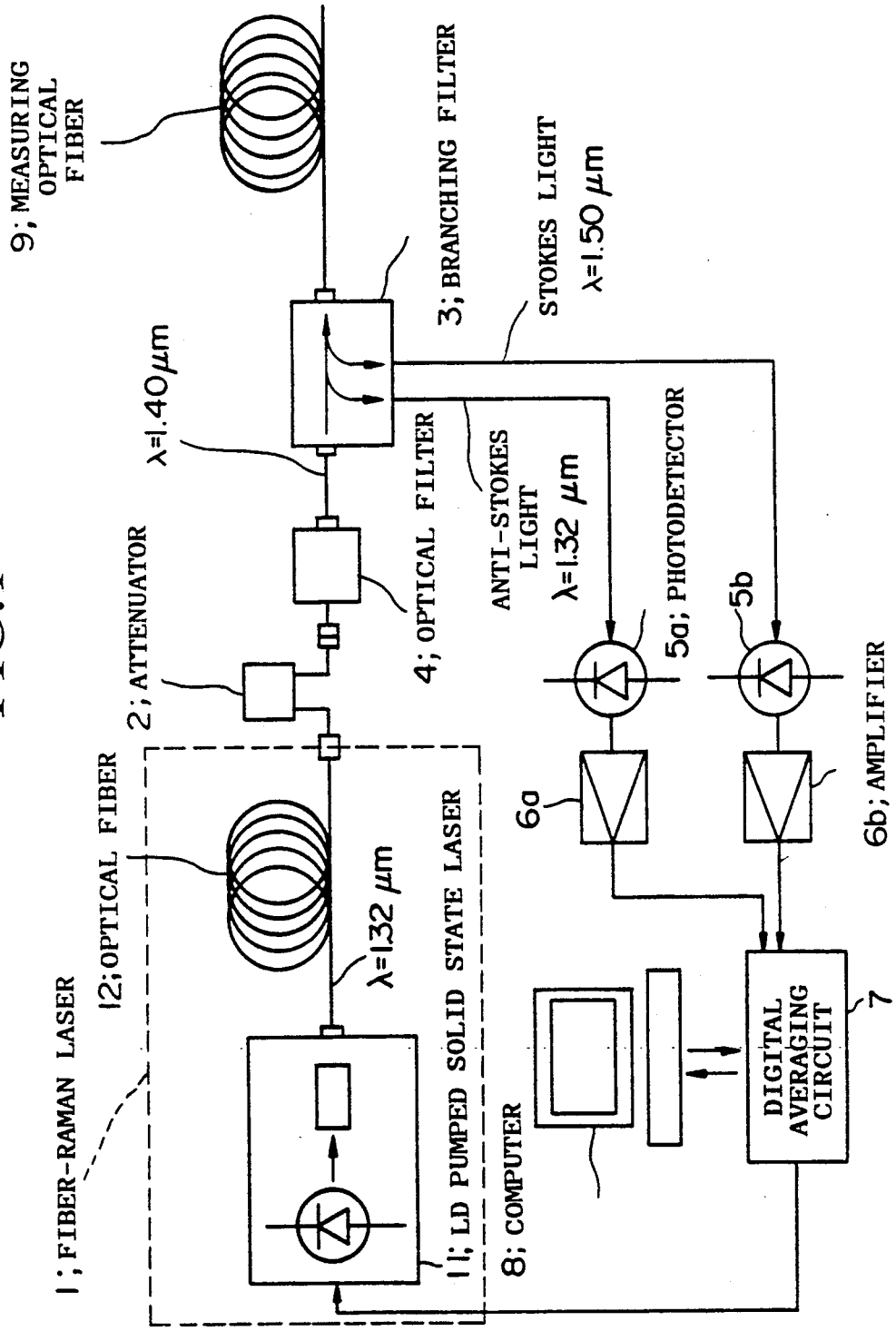
FIG. 1 is a block diagram showing the configuration of a temperature distribution analyzer of a preferred embodiment of the present invention.

In FIG. 1, a block diagram showing the configuration of a temperature distribution analyzer of a preferred embodiment of the present invention is presented. Shown in the diagram is a LD pumped solid state laser 11 which generates pulse light, the wavelength λ of which is 1.32 µm. The output terminal of LD pumped solid state laser 11 is connected to one of the terminal portions of an optical fiber 12. LD pumped solid state laser 11 and optical fiber 12 constitute a fiber-Raman laser 1 for generating pulse light which includes high-intensity Raman-Scattered light.

In the case where light is input to an optical fiber, Rayleigh-scattering and Raman-scattering phenomena occur in the fiber, thereby generating Rayleigh-Scattered light having a wavelength which is equal to the wavelength of the input light, and also generating Raman-scattered light having a wavelength which is different from the wavelength of the input light. The intensities of the Rayleigh-scattered light and the Raman-scattered light increase proportion to the increase of the intensity of the input light in the case where the input light intensity is relative low. However, in the case where the intensity of the input light exceeds a threshold level of the optical fiber, a stimulated-Raman-scattering phenomenon is established in which the intensity of the Raman-scattered light increases rapidly according to a non-linear curve in proportion to the increase of the input light intensity. Furthermore, the intensity of the Stokes light of the Raman-scattered light increase rapidly in relation to the increase of the input light intensity. This causes a decrease of the intensity of Rayleigh-scattered light and the Anti-Stokes light of the Raman-Scattered light because the the energy of the input light used for the generation of the Stokes light increases while the remaining energy used for the generation of the Rayleigh-Scattered light and the Anti-Stokes light decreases. A LD pumped solid state laser can generate a pulse light having high energy greater than several watts which is higher than the threshold level of optical fiber 12. Thus, Raman-Scattered light consisting essentially of the Stokes light is generated and output from optical fiber 12. The wavelength of the Stokes light is shifted toward the longer wavelengths relative to the wavelength of the input pulse light. In the case where the wavelength λ of the input pulse light is 1.32 µm, optical fiber 12 outputs Stokes light including 1st Stokes light having a wavelength of 1.40 µm, 2nd Stokes light having a wavelength of 1.50 µm, 3rd Stokes light having a wavelength of 1.60 µm, 4th Stokes light having a wavelength of 1.72 µm and other higher order light. The Stokes light has intensity higher than 100 mW. Furthermore, the Stokes light as above obtained is minimally coherent.

An optical attenuator 2 and an optical filter 4 are connected in a cascade to the other terminal portion of optical fiber 12. Optical filter 4 selects and outputs a light component, the wavelength λ of which is 1.40 µm, which is included in the input light of the filter. A light branching filter 3 is made up of a diffraction grating or a thin-film optical filter such as a multi-layered dielectric film. The pulse light generated by fiber-Raman laser 1 is introduced to one of the terminal portions of a temperature measuring optical fiber 9 as an input pulse light. The input pulse light propagates through measuring optical fiber 9 toward the other terminal portion thereof. This fiber is provided so as to pass a target region, the temperature distribution of which is to be obtained. During the propagation of the input pulse light, scattering phenomenon occur in measuring optical fiber 9 thereby generating scattered light of differing wavelengths. A portion of the scattered light is fed back to branching filter 3 as backscattered light. The branching filter selectively outputs light components which are included in the backward-scattered light and which have different wavelengths, so that each light component is output in a direction which is determined according to the wavelength of the component. Photoreceptors 5a and 5b are provided for receiving the specified light components output from branching filter 3 so that a light component, the wavelength λ of which is 1.32 µm, is received by photodetector 5a, as well as a light component, the wavelength λ of which is 1.50 µm, is received by photodetector 5b. Photoreceptors 5a and 5b then convert the received light to electrical signals. The output electrical signals of photodetectors 5a and 5b are respectively amplified by amplifiers 6a and 6b. Digital averaging circuit 7, under control of a computer 8, repeatedly performs triggering opertions in which a trigger signal is supplied to LD pumped solid state laser 11 to generate a pulse light, and performs an averaging operation in which the waveforms of the output signals of amplifier 6a and 6b are averaged over time to determine average waveform data. More specifically, in digital averaging circuit 7, after the triggering operation, the output signals of amplifiers 6a and 6b are converted to digital signals by a predetermined sampling period by A/D converters (not shown) after the triggering operation to produce two groups of sample data indicating the waveforms of the output signals of amplifiers 6a and 6b. The sample data are averaged with respect to a predetermined number of the triggering operations to produce the above-described average waveform data. This average operation helps to increase the accuracy of the temperature distribution analysis. The average waveform data corresponding to the output signal of amplifier 6b is used for a operation which determines a noise of the waveform data. The noise is generated due to a number of effects such as bending of the fiber. Computer 8 cancels the noise from the average waveform data corresponding to the output signal of the amplifier 6a which indicates the variation over time of the Anti-Stokes light. Computer 8 then analyzes the resulting waveform data to obtain the temperature distribution of the measuring optical fiber.

The operation of the temperature distribution analyzer will be described herein below. In fiber-Raman laser 1, a high-intensity pulse light having a wavelength of 1.32 µm is introduced to optical fiber 12 by LD pumped solid state laser 11 when a trigger signal is supplied by digital averaging circuit 7. This causes the stimulated-Raman-scattering phenomenon in optical fiber 12, thereby generating Raman-scattered light substantially consisting of Stokes light which have high intensities and differing wavelengths. The Raman-scattered light generated in optical fiber 12 is output therefrom and attenuated by attenuator 2, thereby obtaining light having an intensity which is lower than the threshold level of measuring optical fiber 9 and which does not cause Raman-scattering in measuring optical fiber 9. The output light of attenuator 2 is input to optical filter 4. Optical filter 4 selects and outputs the Stokes light having a wavelength of 1.40 $\mu$m included in the input scattered light. The other Stokes light, the wavelengths of which is different from 1.40 $\mu$m, is not output from optical filter 4. The output light of optical filter 4 is introduced to measuring optical fiber 9 via branching filter 3. As a result, the Raman-scattering phenomenon is established in measuring optical fiber 9 whereby Raman-backscattered light including Stokes light having a wavelength of 1.50 $\mu$m and Anti-Stokes light having a wavelength of 1.32 $\mu$m is fed back to the terminal portion of fiber 9 at high intensity which is high enough to be used for analysis of the temperature distribution. The wavelengths of the Stokes light and Anti-Stokes light are high enough to satisfy a condition for the single mode transmission in fiber 9 with respect to wavelengths. Accordingly the Stokes and the Anti-Stokes components are fed back to the input terminal portion with low transmission loss. The input light for measuring optical fiber 9 has low coherence. Accordingly, the level of the interference noise is very low which is generated in the fiber and outputs thereof with the Stokes light and the Anti-Stokes light. The Stokes light and Anti-Stokes light are divided by branching filter 3 and converted electrical signals respectively by photodetectors 5b and 5a. The output electronic signals of photodetectors 5a and 5b are respectively amplified by amplifiers 6a and 6b, and then supplied to digital averaging circuit 7. Digital averaging circuit 7 determines and holds sample data indicating the waveforms of the output signals of amplifiers 6a and 6b. Digital averaging circuit 7 then supplies a next trigger signal to LD pumped solid state laser 11. The same operations as above-described are repeated a predetermined number of times. Digital averaging circuit 7 then determines two average waveform data indicating the average waveform of the output signals of amplifiers 6a and 6b. Computer 8 performs a canceling operation in which a noise generated by a number of effects such as bending of the fiber is determined based on the two average waveform data and the noise is subtrated from the output signal of the amplifier 6a which indicates the variation over time of the Anti-Stokes light to produce a waveform data indicating the variation over time of Anti-Stokes light including no noise. Computer 8 then analyzes the produced waveform data to determine the temperature distribution of the target region.

What is claimed is:

1. A temperature distribution analyzer comprising:
    a measuring optical fiber which is provided so as to extend through a target region for analyzing the temperature distribution of the target region, the measuring optical fiber having a cut-off wavelength in the range of 1.25 $\mu$m to 1.28 $\mu$m;
    a LD pumped solid state laser for repeatedly generating a high-intensity pulse light having a wavelength of 1.32 $\mu$m;
    an optical fiber, one terminal portion of which receives pulse light, and which a stimulated-Raman-scattering phenomenon is established to generate Raman-scattered light including light having a wavelength of 1.40 $\mu$m, the optical fiber thereby outputting the Raman-scattered light from the other terminal portion thereof;
    an optical filter for selecting the light having a wavelength of 1.40 $\mu$m from the Raman-scattered light and for outputting the selected light;
    an optical means for introducing the output light of said optical fiber to one of the terminal portions of said measuring optical fiber and for receiving Raman-backscattered light generated in the measuring optical fiber through said terminal portion said Raman-backscattered light including an Anti-Stokes light, the wavelength of which is longer than the cut-off wavelength of said measuring optical fiber;
    a photodetector for converting the Raman-backscattered light to an electrical signal; and
    a computing means having a digital averaging circuit for performing an A D conversion to generate digital signals indicating the variation over time of the electrical signals obtained from said photodetector in response to said pulse light every time said pulse light is generated by said LD pumped solid state laser and performing an averaging operation in which the digital signals obtained through said A D conversion are averaged in time, and said computing means determining temperatures of said measuring optical fiber based on the output of said digital averaging circuit.

2. A temperature distribution analyzer according to claim 1 wherein said optical device includes a branching filter for selecting said Anti-Stokes light included in said Raman-backscattered light and for supplying said Anti-Stokes light to said photodetector.

3. A temperature distribution analyzer according to claim 2 wherein said LD pumped solid state laser is constructed of Nd-doped YAG as a solid crystal, and outputs a light having a wavelength of 1.32 $\mu$m from said solid crystal.

4. A temperature distribution analyzer according to claim 2 wherein said LD pumped solid state laser is constructed of YLF as a solid. crystal, and outputs a light having a wavelength of 1.32 $\mu$m from said solid crystal.

* * * * *

UNITED STATES PATENT AND TRADEMARK OFFICE
CERTIFICATE OF CORRECTION

PATENT NO. : 5,217,306
DATED : June 8, 1993
INVENTOR(S) : Fumio Wada

It is certified that error appears in the above-identified patent and that said Letters Patent is hereby corrected as shown below:

In the claims:

Column 6, Line 32:  "A D" should be -- A/D --

Column 6, Line 39:  "A D" should be -- A/D --

Signed and Sealed this

Eighteenth Day of January, 1994

Attest:

BRUCE LEHMAN

Attesting Officer    Commissioner of Patents and Trademarks